United States Patent
Bang et al.

(10) Patent No.: US 8,189,028 B2
(45) Date of Patent: May 29, 2012

(54) METHOD AND APPARATUS FOR TAKING IMAGES DURING A VIDEO CALL ON A MOBILE COMMUNICATION TERMINAL

(75) Inventors: Ji Young Bang, Seoul (KR); Jeong Hoon Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1370 days.

(21) Appl. No.: 11/819,605

(22) Filed: Jun. 28, 2007

(65) Prior Publication Data

US 2008/0024592 A1 Jan. 31, 2008

(30) Foreign Application Priority Data

Jul. 27, 2006 (KR) ........................ 10-2006-0070922

(51) Int. Cl.
*H04N 7/14* (2006.01)
(52) U.S. Cl. .................................. 348/14.02; 348/14.01
(58) Field of Classification Search ................ 348/14.1, 348/14.12, 14.14, 231.6, 211.11, 248.12, 348/14.01; 455/414.1, 416; 370/259, 260
See application file for complete search history.

(56) References Cited

U.S. PATENT DOCUMENTS

| | | |
|---|---|---|
| 2003/0222974 A1 | 12/2003 | Yoneyama et al. |
| 2006/0050154 A1 | 3/2006 | Kobayashi et al. |

FOREIGN PATENT DOCUMENTS

| | | |
|---|---|---|
| EP | 1492315 A2 | 12/2004 |
| JP | 1020000035675 A | 6/2000 |
| JP | 2001-186487 | 7/2001 |
| JP | 1020020008858 A | 2/2002 |
| JP | 2003-032744 | 1/2003 |
| JP | 2005-136695 | 5/2005 |
| KR | 1020000035675 A | 6/2000 |
| KR | 1020020008858 A | 2/2002 |
| KR | 1020050054684 A | 10/2005 |
| KR | 1020050106787 A | 11/2005 |
| KR | 1020060078446 A | 7/2006 |

*Primary Examiner* — Tuan Nguyen
(74) *Attorney, Agent, or Firm* — Roylance, Abrams, Berdo & Goodman, LLP (57) ABSTRACT

A method and apparatus for taking images while making a video call on a mobile communication terminal having a video call feature are provided. A method for taking images on a mobile communication terminal including a camera sensor for photographing an image to output an image signal and a signal processor receiving the image signal from the camera sensor to convert the image signal to image data includes determining whether there is a request to take an image during a video call and extracting, if there is a request to take an image, the image signal output from the camera sensor, converting the image signal to image data for storage, and storing the image data while performing the video call. The method enables production and storage of image data using a controller instead of a signal processor functioning for performing a video call, thus allowing high quality still or motion video image data to be taken and stored while making a video call.

24 Claims, 5 Drawing Sheets

METHOD AND APPARATUS FOR TAKING IMAGES DURING A VIDEO CALL ON A MOBILE COMMUNICATION TERMINAL

CROSS-REFERENCE TO RELATED APPLICATIONS

This application claims the benefit under 35 U.S.C. §119(a) of Korean Patent Application Serial No. 2006-0070922, filed in the Korean Intellectual Property Office on Jul. 27, 2006, the entire disclosure of which is hereby incorporated by reference.

BACKGROUND OF THE INVENTION

1. Field of the Invention

The present invention relates to a mobile communication terminal having a video communication function. More particularly, the present invention relates to a method for taking images while making a video call on a mobile communication terminal.

2. Description of the Related Art

In general, a mobile terminal refers to a terminal that is carried by an individual user and supports various functions using application programs including wireless communication services. Examples of a mobile terminal may include a personal mobile communication services terminal, a personal digital assistant (PDA), a smart phone, an international mobile telecommunication 2000 (IMT-2000) terminal, and a wireless local area network (LAN) terminal.

Generally, a mobile terminal has voice calling and short message service (SMS) functions. However, recent, rapid development of mobile communication technology has allowed a mobile terminal to support diverse and sophisticated functions including video calls, an electronic-note function, audio/image storage, Internet access, and entertainment features. Furthermore, with the advent of a mobile terminal having a digital camera function in addition to the above features, users can easily take motion video images and still images (collectively referred to as "images"), can store the images, use the images as wallpaper, or transmit the images via e-mail or by another messaging function to another mobile communication terminal.

The use of the digital camera function also has contributed to the recent development and commercialization of a video calling system. The video calling system enables callers to see images of each other during voice conversations by transmitting the images input to a digital camera to the other party's mobile communication terminal.

That is, video calling features allow a user to send their current images and voice information to another party's mobile communication terminal through their own terminal and receive the other party's images and voice information from the other party's terminal. Thus, the user can see images of the other party on their terminal during phone conversations.

However, a conventional mobile communication terminal has a problem in that still images cannot be taken during a video call. When the conventional mobile communication terminal is connected to another party's terminal for making a video call, a video calling program is loaded into a signal processor. The signal processor then converts an image signal, input through a camera sensor, into low resolution digital data for transmission over a wireless link. Thus, even if a user's request to take a still image is received during a video call, the signal processor cannot perform the task in response to such a request.

Thus, in order to take high quality images during a video call, the conventional mobile communication terminal must first terminate the video call and then convert a video call mode into a still image mode or motion video mode, thus causing user's inconvenience. That is, the conventional mobile communication terminal cannot separately take and store high quality still images or motion video images while making a video call.

Accordingly, there is a need for an improved method and apparatus for taking images during a video call on a mobile communication terminal.

SUMMARY OF THE INVENTION

Exemplary embodiments of the present invention address at least the above problems and/or disadvantages and provide at least the advantages described below. Accordingly, an aspect of the present invention is to provide a method and apparatus for taking images on a mobile communication terminal that can store an image signal input through a digital camera as high quality image data while making a video call.

In order to achieve the above object, according to an exemplary embodiment of the present invention, there is provided a method for taking images on a mobile communication terminal, including determining whether there is a request to take an image during a video call and extracting, if there is a request to take an image, an image signal output from a camera sensor and storing the extracted image signal while performing the video call.

In an exemplary embodiment, a method for taking images on a mobile communication terminal includes determining whether there is a request to take an image during a video call, extracting, if there is a request to take an image, an image signal output from a camera sensor, converting the image signal to image data for storage, and temporarily storing the image data, while performing the video call, terminating the video call and storing the temporarily stored image data.

In accordance with an exemplary embodiment of the present invention, there is provided a mobile communication terminal including a determiner for determining whether there is a request to take an image during a video call, an image extractor for extracting, upon receipt of a signal indicating a request to take an image from the determiner, an image signal output from a camera sensor during the video call, an image converter for converting the image signal extracted by the image extractor into image data for storage and an image storage unit for storing the image data output from the image converter.

In an exemplary embodiment, the apparatus further includes an image processor for displaying the image data stored in the image storage unit on a screen and deleting, upon request for deletion, the displayed image data.

A controller of the mobile communication terminal, according to an exemplary embodiment includes the determiner, the image extractor, the image converter, and the image processor. A storage unit, according to an exemplary embodiment may include the image storage unit for storing image data.

BRIEF DESCRIPTION OF THE DRAWINGS

The above and other objects, features and advantages of the present invention will be more apparent from the following detailed description in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Hereinafter, exemplary embodiments of the present invention are described in detail with reference to the accompanying drawings. Dimensions of the elements or spacing between elements are not to scale.

Figure 1:
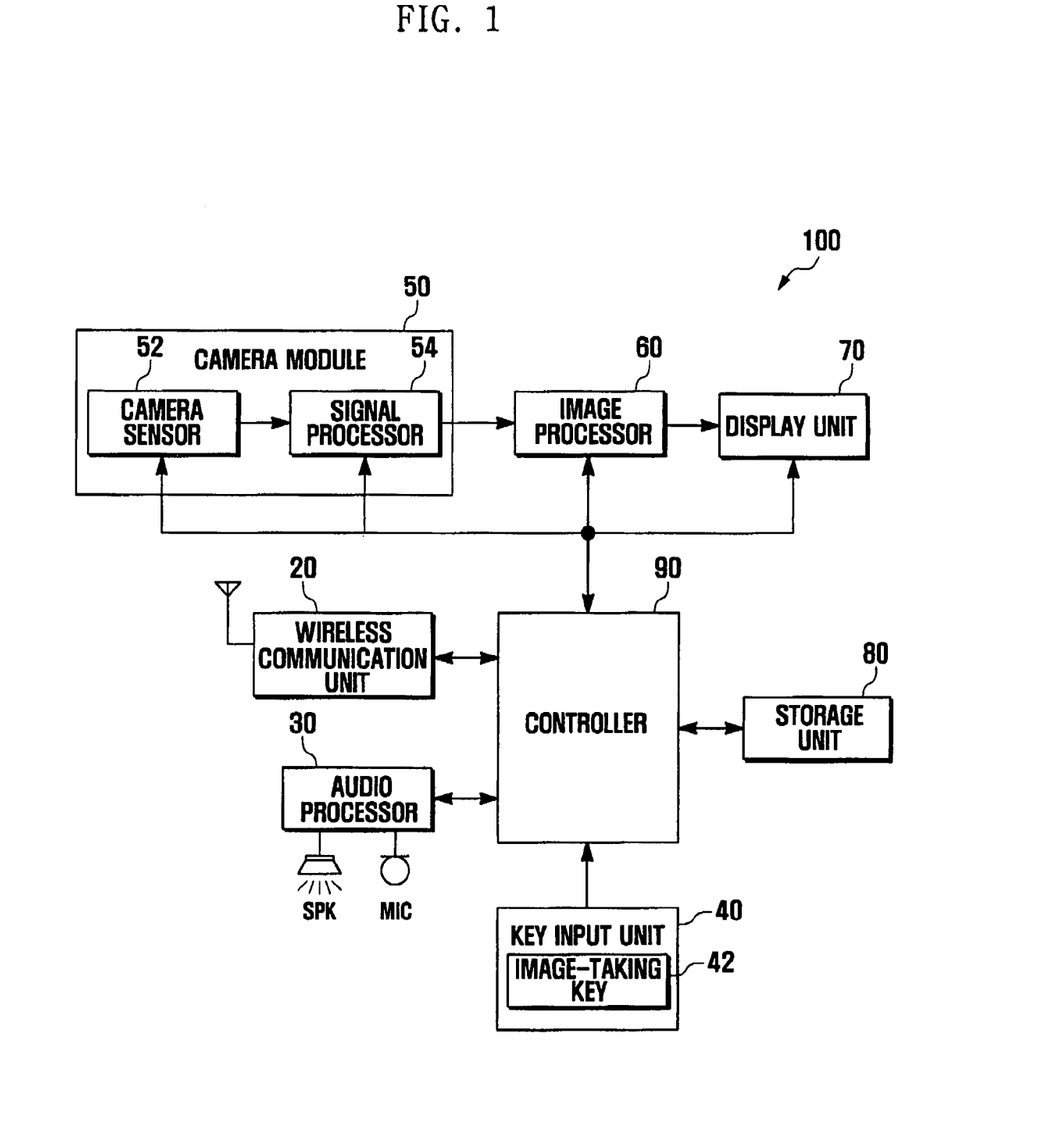
FIG. 1 is a schematic block diagram illustrating a configuration of a mobile communication terminal according to an exemplary embodiment of the present invention.

FIG. 1 is a schematic block diagram illustrating the configuration of a mobile communication terminal 100 according to an exemplary embodiment of the present invention.

Referring to FIG. 1, the mobile communication terminal 100 includes a controller 90, a wireless communication unit 20, an audio processor 30, a key input unit 40, a camera module 50, an image processor 60, a display unit 70, and a storage unit 80. The camera module 50 includes a camera sensor 52 and a signal processor 54.

The wireless communication unit 20 transmits and receives data for wireless communication. To achieve this function, the wireless communication unit 20 includes an RF transmitter that up-converts and amplifies the frequency of a signal being transmitted and an RF receiver that low-noise amplifies a signal being received and down-converts its frequency. The wireless communication unit 20 receives data via a wireless channel to output the data to the controller 90 and receives data from the controller 90 to transmit the data through the wireless channel.

The audio processor 30 includes a coder/decoder (CODEC). The CODEC consists of a data codec for processing data such as packet data and an audio codec for processing audio signals such as voice. The audio processor 30 converts a digital audio signal fed into the controller 90 to an analog signal during a voice call on the mobile terminal 100 through the audio codec and plays the analog signal through a speaker. The audio processor 30 also converts an analog audio signal received through a microphone to a digital audio signal through the audio codec and transmits the digital audio signal to the controller 90.

The key input unit 40 receives a user's manipulation signal for controlling the mobile communication terminal 100 to transmit the signal to the controller 90. To achieve this function, the key input unit 40 includes multiple character keys (not shown) for inputting numeric and character information and control keys (not shown) for controlling the operation of the mobile communication terminal 100. An exemplary key input unit 40 of the present invention further includes an image-taking key 42 for storing images (still or motion video images). In an exemplary embodiment, the image-taking key 42 may be realized in hardware together with the character keys and control keys. The image-taking key 42 may also however, be realized in software.

The camera sensor 52 of the camera module 50 takes an image formed by a lens and converts the resulting optical signal to an electrical signal. The camera sensor 52 may be a charge coupled device (CCD) or complementary metal oxide semiconductor (CMOS) sensor.

The signal processor 54 of the camera module 50 converts an analog image signal output from the camera sensor 52 to digital data. The signal processor 54 may be a digital signal processor or other signal processor.

The image processor 60 outputs image data obtained by dividing an image signal received from the camera module 50 into frames to match the display characteristics and size of the display unit 70. The image processor 60 also compresses the image data to transmit the compressed data to the controller 90. To achieve this function, the image processor 60 includes an image codec for compressing the image data to be displayed on the display unit 70 using a compression technique. The image codec may also be used for decompressing the compressed image data into original image data. The image codec may be a Joint Pictures Experts Group (JPEG) codec, Moving Pictures Experts Group (MPEG) codec, or Wavelet codec.

The display unit 70 displays image data output from the image processor 60 on a screen. The display unit 70 may be a liquid crystal display (LCD). In this case, the display unit 70 may include an LCD controller, a memory for storing image data, an LCD display element and the like. When the LCD is implemented using a touch screen technology, the screen of the display unit 70 may function as an input portion.

The storage unit 80 may include a program memory for storing programs for controlling the operation of the mobile communication terminal 100. The storage unit 80 may further comprise a data memory for storing data generated while executing the programs and still or motion video images input through the camera sensor 52. The data memory may also store various programs loaded into the signal processor 54, such as a video calling program, a still image program, and a motion video program.

The controller 90 performs the overall control operation of the mobile communication terminal 100. Upon receiving the user's request to take an image during a video call, the controller 90 converts an image signal output from the camera sensor 52 to image data for storage and controls the storage unit 80 to store the image data.

A method and apparatus for photographing an image on a mobile communication terminal according to exemplary embodiments of the present invention will now be described in detail with reference to FIGS. 1-3B. The above described configuration of the mobile communication terminal 100 will also become more apparent from the following description of the exemplary method for photographing images.

Figure 2A:
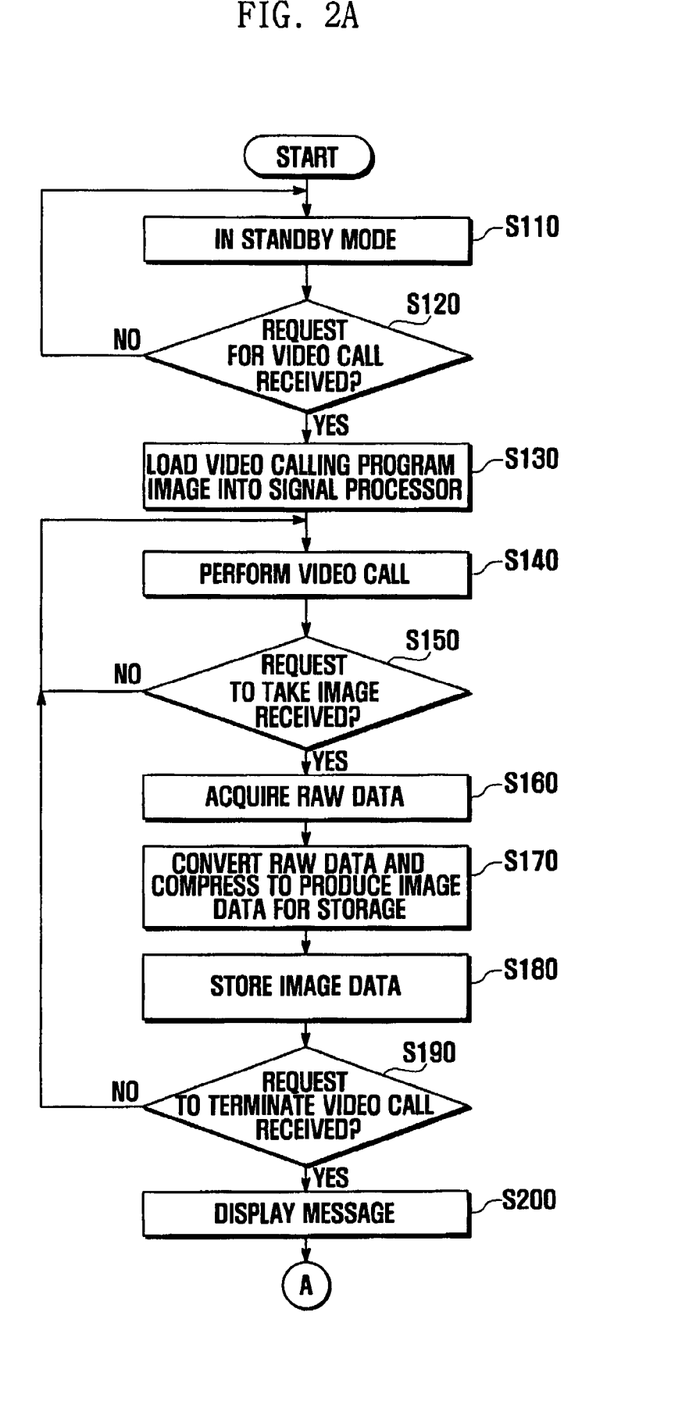
FIGS. 2A and 2B are a flowchart illustrating a method for taking images on a mobile communication terminal according to an exemplary embodiment of the present invention.
Figure 2B:
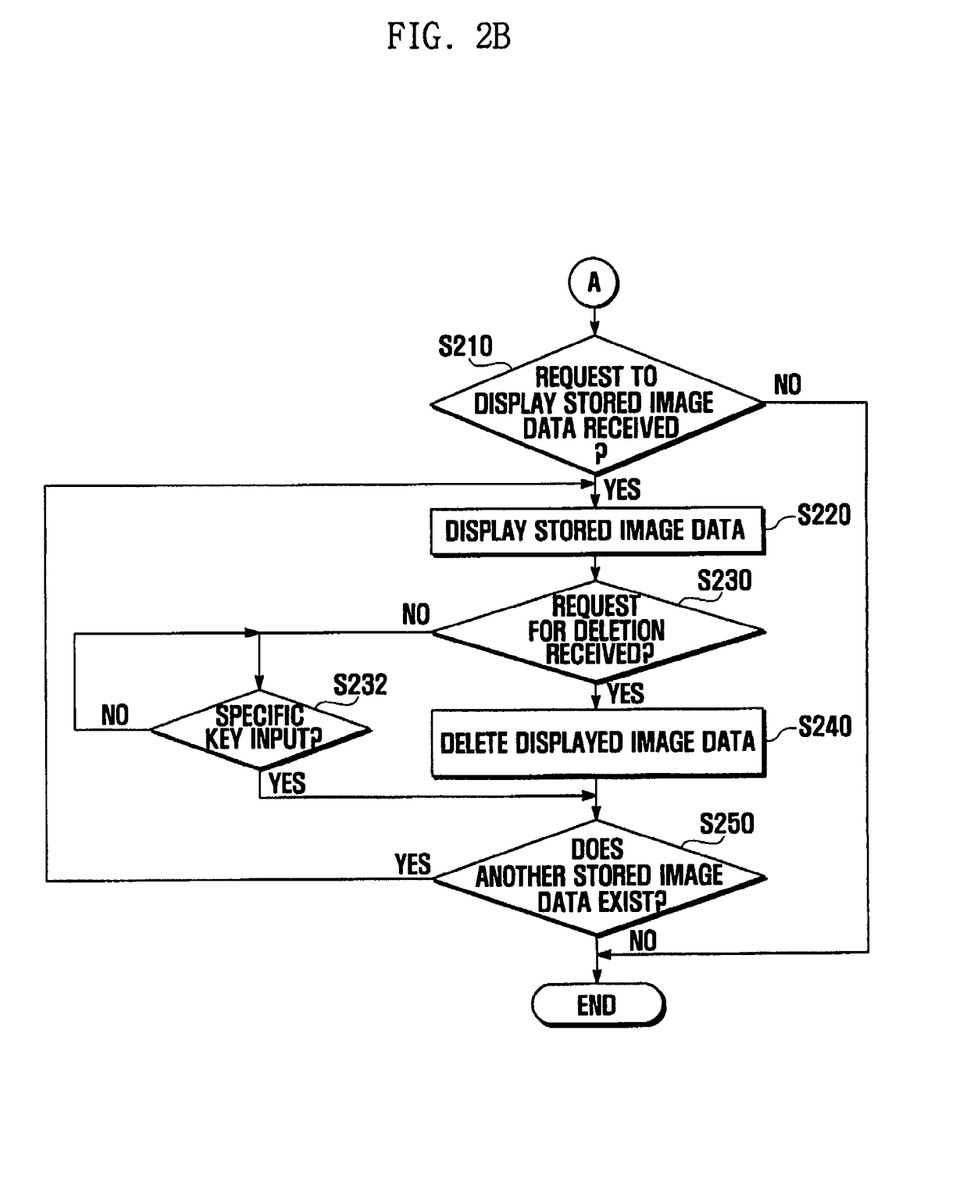

FIGS. 2A and 2B are a flowchart illustrating a method for taking images on a mobile communication terminal according to an exemplary embodiment of the present invention.

Referring to FIGS. 1-2B, in a state in which the mobile communication terminal 100 is in a standby mode (S110), if a key input occurs, the controller 90 determines whether the key input represents a request for a video call (S120). If the key input represents a request for a video call, the controller 90 loads a video calling program into the signal processor 54 of the camera module 50 (S130).

More specifically, a program corresponding to a mode of the mobile communication terminal 100 is loaded into the signal processor 54. For example, if the mobile communication terminal 100 is in a still image-taking mode, a camera program may be loaded into the signal processor 54. If the mobile communication terminal 100 is a in a motion video-taking mode, a camcorder program may be loaded into the signal processor 54. Similarly, as described above, when the mobile communication terminal 100 is in a video call mode, a video calling program is loaded therein.

Programs are intended for generating optimized still images, motion video, and video calling motion video. The programs are loaded into the signal processor 54 by the controller 90 when necessary to drive the signal processor 54. The programs are stored in the storage unit 80. When the mode of a built-in camera of the mobile communication terminal 100 is converted to a specific mode, the controller 90 fetches a program corresponding to the mode and loads it into the signal processor 54.

When the controller 90 loads a video calling program stored in the storage unit 80 into the signal processor 54, the signal processor 54 converts an image input through the camera module 50 to image data for transmission. Thereafter, the controller 90 sends the image data for transmission to another party's mobile communication terminal to perform a video call (S140). That is, the video calling program loaded into the signal processor 54 drives the signal processor 54 to convert the image input through the camera sensor 52 to digital data optimized with respect to the image data for transmission. The signal processor 54 then transmits the digital data to the image processor 60. The image processor 60 transmits the received digital data to the display unit 70 while compressing the digital data into image data before transmitting the resulting image data to the controller 90.

The controller 90 receives the image data from the image processor 60 to transmit it to the other party's mobile communication terminal through the wireless communication unit 20. This allows the user of the mobile communication terminal 100 to make a face-to-face video call with the other party while seeing a motion video being transmitted by the other party.

Next, the mobile communication terminal 100 determines whether a request to take an image is received (S150). The user manipulates the image-taking key 42 to store an image being currently input through the camera module 50 as separate image data ("image data for storage"). The controller 90, having received the request to take an image, receives an image signal, in other words, raw data, directly from the camera sensor 52 (S160).

The image data for storage may be extracted from the digital data output through the signal processor 54 or from image data output through the image processor 60 for storage. However, in both of these cases, the extracted image data has a low resolution because it is optimized with respect to a motion video image for transmission. Thus, in an exemplary embodiment of the present invention, the image data for storage is produced using an image signal output from the camera sensor 52 before being optimized for conversion. The image signal output from the camera sensor 52 may be a YUV, RGB or similar signal.

When an image signal is input from the camera sensor 52 to the controller 90, the controller 90 converts the image signal, which is input as analog data, into digital data and compresses the digital data to produce image data for storage (S170). In this case, the controller 90 generates image data for storage having a visual quality corresponding to a resolution that may be preset by the user. That is, the controller 90 produces a high quality image having the same resolution as image data being stored in a still image taking mode.

After the image data for storage has been produced, the controller 90 controls the storage unit 80 to store the image data for storage (S180). The controller 90 then determines whether there is a request to terminate the video call (S190). If a request to terminate the video call is not received, the controller 90 repeats the steps S140 through S180. Thus, as the number of repetitions of the steps S140 through S180 increases, the amount of image data being stored in the storage unit 80 increases.

If a request to terminate the video call is received (S190), the controller 90 controls the display unit 70 to display a message requesting whether to display the image data being stored in the storage unit 80 (S200). If the user requests display of the stored image data in step S210, the controller 90 controls the display unit 70 to display the stored image data (S220).

If the user requests deletion of the stored image data being displayed on the display unit 70 (S230), the controller 90 deletes the stored image data displayed on the display unit 70 from the storage unit 80 (S240). Next, the controller 90 checks whether another stored image data exists (S250). If another stored image data exists, the controller 90 controls the display unit 70 to display the stored image data for storage (S220). If another stored image data does not exist, the controller 90 determines that there is no more image data to be displayed on the display unit 70 and converts the mode of the mobile communication terminal 100 to a standby mode.

If at least one additional image data is stored in the storage unit 80, the controller 90 controls the display unit 70 to sequentially display the stored image data. That is, the steps S220 through S250 are repeated for each stored image data. If a specific key (not shown), such as a directional arrow or volume control key, is input by the user while one storage image data is displayed (S232), the controller 90 controls the display unit 70 to display another stored image data. Thus, the user can see all the image data stored during a video call.

Figure 3A:
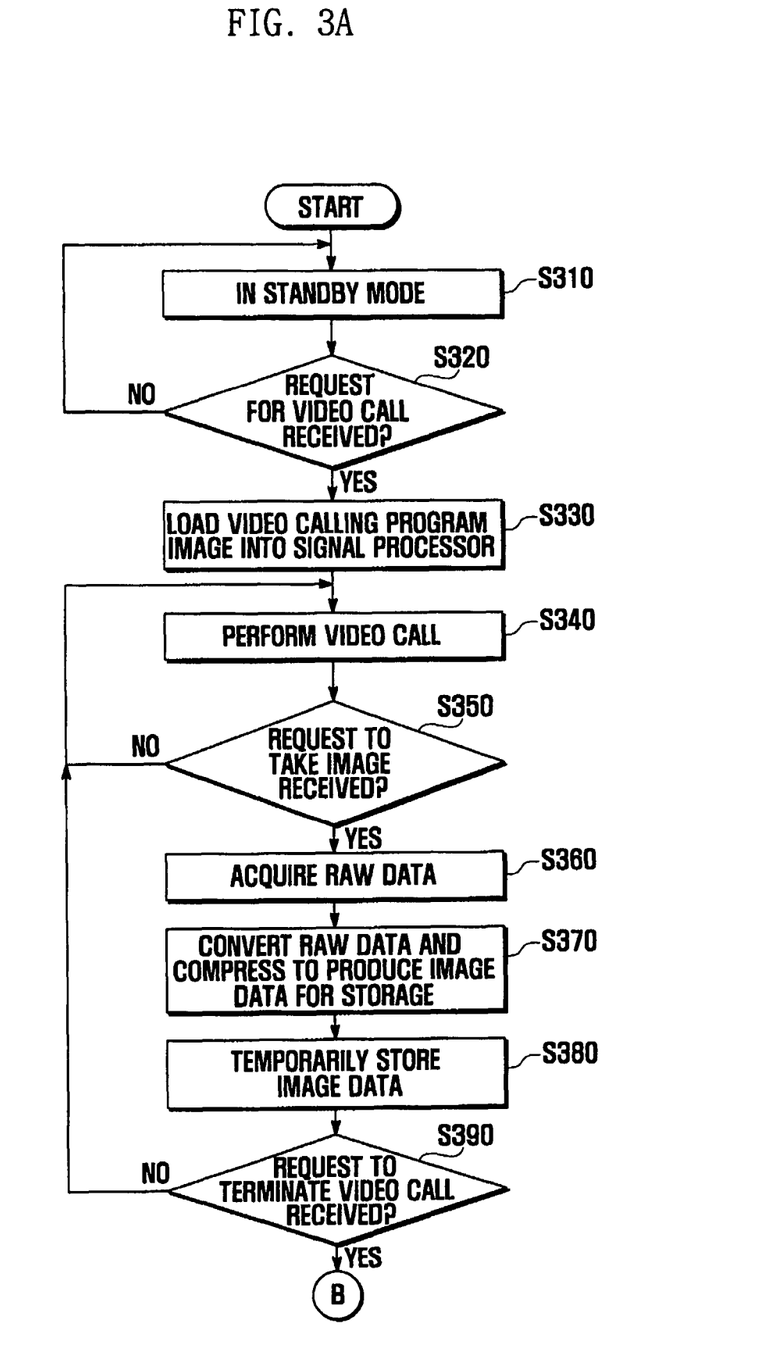
FIGS. 3A and 3B are a flowchart illustrating a method for taking images on a mobile communication terminal according to another exemplary embodiment of the present invention.
Figure 3B:
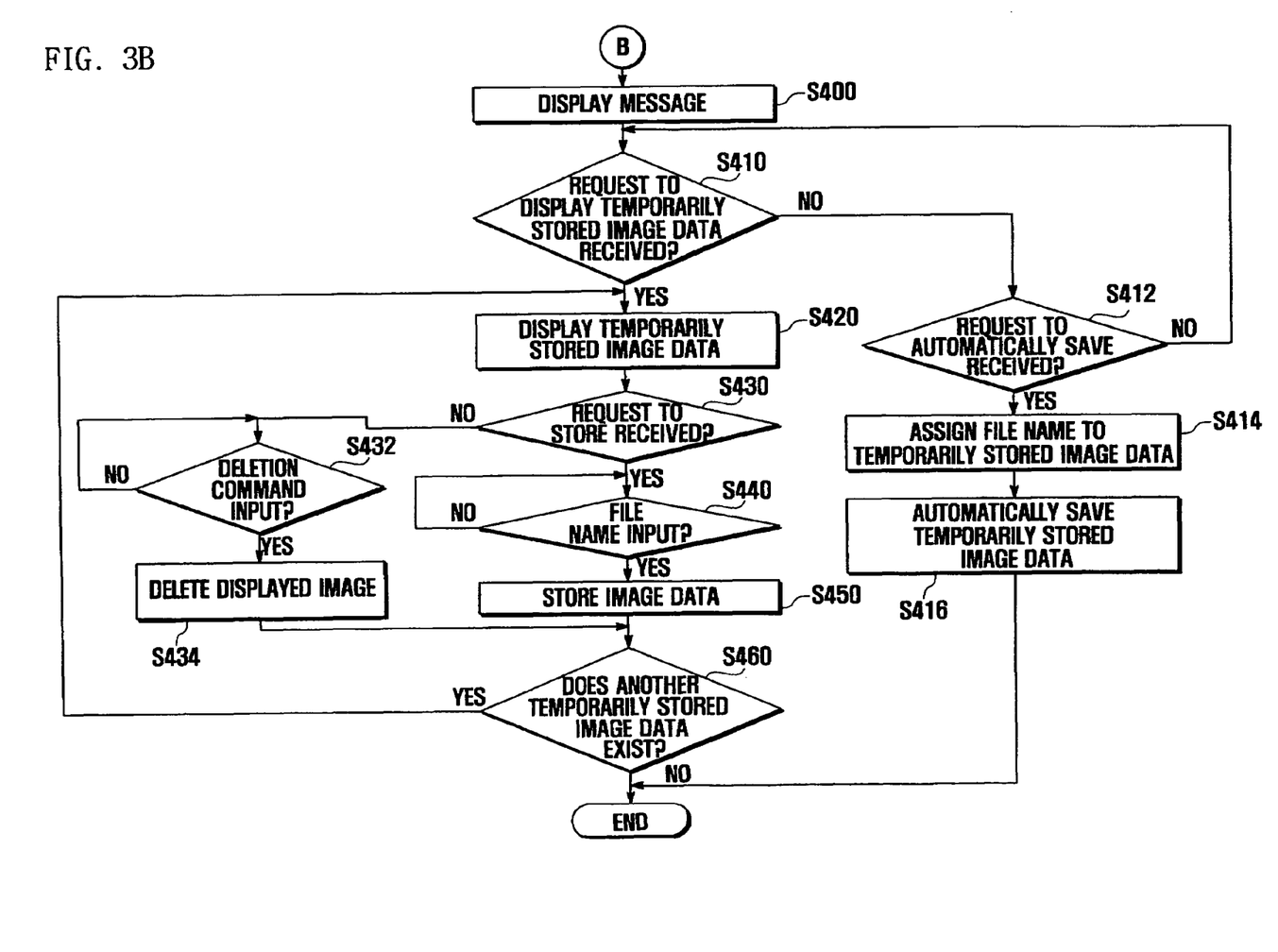

FIGS. 3A and 3B are a flowchart illustrating a method for taking images on a mobile communication terminal according to another exemplary embodiment of the present invention.

Referring to FIGS. 1, 3A, and 3B, steps S310 through S370 in FIG. 3A are substantially the same as their counterparts (steps S110 through S170) in FIG. 2A, and thus a detailed explanation thereof is not given here. After image data for storage has been produced in step S370, the controller 90 controls the storage unit 80 to temporarily store the image data (S380). Alternatively, the image data may be stored in a buffer memory (not shown) within the controller 90 or other memory locations.

After the image data has been temporarily stored during the video call, the controller 90 determines whether there is a request to terminate the video call (S390). If a request to terminate the video call is not received and the image-taking key 42 is input again, the controller 90 repeats the steps S340 through S380. As the number of repetitions of the steps S340 through S380 increases, the amount of image data being temporarily stored in the storage unit 80 increases.

If a request to terminate the video call is received in the step S390, the controller 90 controls the display unit 70 to display a message requesting whether to display the temporarily stored image data (S400). The message contains buttons representing 'display image data' and 'automatically save image data.' By inputting one of the buttons, the user can select whether to display image data temporarily stored during the video call on the display or whether to automatically save all of the temporarily stored image data without checking them.

If the user requests display of the image data (S410), the controller 90 controls the display unit 70 to display the temporarily stored image data (S420) simultaneously with a message requesting whether to save or delete the image data displayed on the display unit 70.

After watching the displayed image data, if the user requests that it be saved (S430), the controller 90, having received the user's request, controls the display unit 70 to display a window for inputting a file name for the displayed image data. When the user inputs the file name (S440), the controller 90 controls the storage unit 80 to store the displayed image data as the file name (S450). Otherwise, if the step S440 is omitted, the controller 90 may randomly assign a file name to the displayed image data for storage.

If the user requests deletion of the temporarily stored image data (S432), the controller 90 deletes the displayed image data (S434).

The controller 90 then checks whether another temporarily stored image data exists (S460). If another temporarily stored image data exists, the controller 90 controls the display unit 70 to display the temporarily stored image data for storage (S420). That is, the controller 90 repeats the steps S420 through S450. If another temporarily stored image data does not exist, the controller 90 determines that there is no more image data to be stored and converts the mode of the mobile communication terminal 100 to a standby mode.

If the user requests the displayed image data to be automatically saved (S412), the controller 90, having received the user's request, randomly assigns a file name to the temporarily stored image data (S414) and controls the storage unit 80 to store the image data (S416). In this case, when a plurality of image data have been temporarily stored, the controller 90 assigns a file name to each image data and controls the storage unit 80 to store the image data. This process is repeatedly performed until all of the image data are automatically saved.

As described above, a method for taking images on the mobile communication terminal 100 enables production of image data for storage using the controller 90 instead of the signal processor 54, thus providing high quality image data for storage to a user without having to terminate a video call.

While the present invention has been particularly shown and described with reference to exemplary embodiments thereof, it will be understood by those of ordinary skill in the art that various changes in form and details may be made therein without departing from the spirit and scope of the present invention as defined by the following claims and the full scope of equivalents thereof. For example, while in the above description, a high quality still image is stored in the storage unit 80 during a video call, a motion video image can be stored therein. Further, the present invention can be applied to a mobile communication terminal having a camera function and any other type of electronic device supporting video calls.

As described in the foregoing, a method for taking images on a mobile communication terminal enables production and storage of image data using a controller instead of a signal processor functioning for performing a video call, thus allowing high quality still or motion video image data to be taken and stored while making a video call.

What is claimed is:

1. A method for taking images on a mobile communication terminal having a video call function, the method comprising:
   determining whether there is a request to take an image during a video call;
   extracting an image signal output from a camera sensor upon receipt of the request to take an image during a video call; and
   storing the extracted image signal while performing the video call.

2. The method of claim 1, wherein the extracting of the image signal comprises:
   extracting, upon request to take an image, the image signal while performing the video call; and
   converting the extracted image signal into image data for storage.

3. The method of claim 2, wherein the storing of the extracted image signal comprises storing the image data.

4. The method of claim 1, wherein the extracting of the image signal comprises extracting at least one of raw data that has not been processed and raw data that has not been converted.

5. The method of claim 2, wherein the converting of the extracted image signal comprises converting the image signal into at least one of still image data and motion video data.

6. The method of claim 2, further comprising:
   determining whether there is a request to terminate the video call; and
   terminating the video call if there is a request to terminate the video call.

7. The method of claim 6, further comprising displaying the stored image data.

8. The method of claim 7, wherein the displaying of the stored image data comprises:
   displaying a message requesting whether to display the stored image data; and
   displaying, if a request is received to display the image data, the stored image data.

9. The method of claim 8, further comprising deleting the displayed image data if there is a request for deletion.

10. A method for taking images on a mobile communication terminal having a video call function, the method comprising:
    determining whether there is a request to take an image during a video call;
    extracting an image signal output from a camera sensor upon receipt of the request to take an image during a video call;
    converting the image signal to image data for storage;
    temporarily storing the image data, while performing the video call;
    terminating the video call; and
    storing the temporarily stored image data.

11. The method of claim 10, wherein the extracting of the image signal comprises extracting at least one of raw data that has not been processed and raw data that has not been converted.

12. The method of claim 10, wherein the converting of the extracted image signal comprises converting the image signal into at least one of still image data or motion video data.

13. The method of claim 10, wherein the terminating of the video call comprises:
    determining whether there is a request to terminate the video call; and
    terminating the video call if there is a request to terminate the video call.

14. The method of claim 10, wherein the storing of the temporarily stored image data comprises:
    inputting a file name for the image data; and
    storing the image data as the input file name.

15. The method of claim 10, further comprising:
- displaying a message requesting whether to display or automatically save the temporarily stored image data; and
- displaying, if a request is received to display the temporarily stored image data, the temporarily stored image data.

16. The method of claim 14, wherein the storing of the temporarily stored image data further comprises automatically saving the temporarily stored image data for storage, if a request is received to automatically save the temporarily stored image data.

17. The method of claim 16, wherein the automatically saving of the temporarily stored image data for storage comprises:
- inputting a file name for the image data; and
- storing the image data as the input file name.

18. The method of claim 15, wherein the temporarily stored image data displayed in the displaying of the temporarily stored image data step is deleted upon request for deletion.

19. A mobile communication terminal having a video call function, comprising:
- a determiner for determining whether there is a request to take an image during a video call;
- an image extractor for extracting, upon receipt of a signal indicating the request to take an image during a video call from the determiner, an image signal output from a camera sensor during the video call;
- an image converter for converting the image signal extracted by the image extractor into image data for storage; and
- an image storage unit for storing the image data output from the image converter.

20. The terminal of claim 19, further comprising an image processor for displaying the image data stored in the image storage unit on a screen and deleting, upon request for deletion, the displayed image data.

21. A method for taking images on a mobile communication terminal, the method comprising:
- performing a video calling function using a camera module having a camera sensor on a mobile communication terminal;
- receiving a request to take an image during the video call;
- extracting an image signal output from the camera sensor during the video call upon receipt of the request to take an image during a video call; and
- storing the extracted image signal during the video call.

22. The method of claim 21, wherein the performing of the video calling function using the camera module comprises processing the image signal output from the camera sensor by a signal processor.

23. The method of claim 22, wherein the extracting of the image signal output from the camera sensor comprises transmitting the image signal to a controller.

24. The method of claim 23, wherein the transmitting of the image signal to the controller comprises transmitting at least one of raw data that has not been processed and raw data that has not been converted.

* * * * *